United States Patent [19]

Coscarella et al.

[11] Patent Number: 5,568,648
[45] Date of Patent: Oct. 22, 1996

[54] INDIRECT ADDRESSING OF CHANNELS VIA LOGICAL CHANNEL GROUPS

[75] Inventors: Anthony Coscarella, Woodstock, N.Y.; Martin W. Sachs, Westport, Conn.; Joseph Temple, Hurley, N.Y.

[73] Assignee: International Business Machines Corporation, Armonk, N.Y.

[21] Appl. No.: 471,475

[22] Filed: Jun. 6, 1995

Related U.S. Application Data

[63] Continuation of Ser. No. 711,474, Jun. 5, 1991.

[51] Int. Cl.$^6$ .............................. G06F 3/00; G06F 13/00
[52] U.S. Cl. .................................................. 395/862
[58] Field of Search ........................ 364/DIG. 1 MS, 364/DIG. 2 MS; 395/842, 858, 821, 823, 416, 474, 200.2, 830, 846, 862, 869; 370/58.2, 60, 81

[56] References Cited

U.S. PATENT DOCUMENTS

| | | | |
|---|---|---|---|
| 4,060,849 | 11/1977 | Bienvenu et al. | 395/858 |
| 4,096,570 | 6/1978 | Ishibashi et al. | 395/821 |
| 4,155,119 | 5/1979 | De Ward et al. | 395/416 |
| 4,207,609 | 6/1980 | Luiz et al. | 395/858 |
| 4,437,157 | 3/1984 | Witalka et al. | 395/858 |
| 4,491,909 | 1/1985 | Shimizu | 395/474 |
| 4,591,973 | 5/1986 | Ferris, III et al. | 395/823 |
| 4,597,074 | 6/1986 | Demichelis et al. | 370/58.2 |
| 4,665,482 | 5/1987 | Murray, Jr. et al. | 395/842 |
| 4,713,806 | 12/1987 | Oberlander et al. | 370/58.2 |
| 4,878,216 | 10/1989 | Yunoki | 370/60 |
| 4,964,119 | 10/1990 | Endo et al. | 370/60 |
| 5,016,247 | 5/1991 | Cidon et al. | 370/81 |
| 5,107,489 | 4/1992 | Brown et al. | 370/58.2 |
| 5,115,427 | 5/1992 | Johnson, Jr. et al. | 370/60 |
| 5,206,933 | 4/1993 | Farrell et al. | 395/200.2 |

FOREIGN PATENT DOCUMENTS 0059838  9/1982  European Pat. Off. .

OTHER PUBLICATIONS

Grossman, "Role of the DASD Storage Control In An Enterprise Systems Connection Environment", IBM Systems Journal, vol. 31, No. 1, 1992, pp. 123–146.

Primary Examiner—Robert B. Harrell
Attorney, Agent, or Firm—Lawrence D. Cutter, Esq.; Sterne, Kessler, Goldstein & Fox P.L.L.C.

[57] ABSTRACT

A computer system for using logical channel groups to indirectly address channels. The computer system includes a processor, a memory, and an input/output (IO) system for transferring information between devices and the processor. The IO system includes channels, channel path identifiers for identifying the channels, logical channel groups having lists of the channel path identifiers, and subchannels having pointers to the logical channel groups. The IO system also includes one or more switches for routing information between the channels and devices.

18 Claims, 11 Drawing Sheets

INDIRECT ADDRESSING OF CHANNELS VIA LOGICAL CHANNEL GROUPS

This application is a continuation of application no. 07/711,474, filed Jun. 5, 1991, currently pending.

DESCRIPTION

1. Technical Field

The present invention relates generally to systems and methods for addressing channels in computer systems, and more particularly to systems and methods for using logical channel groups to indirectly address channels in computer systems.

2. Background Art

Many conventional computer systems suffer from low channel utilization. This is described below with reference to FIGS. 1 and 2. Note that, in the drawings, like reference numbers (with, perhaps, different alphabetic suffixes) indicate identical or functionally similar elements. In this patent document, when generically describing an element, the element's reference number alone is used. When specifically describing a particular element, the element's reference number and alphabetic suffix is used.

Figure 1:
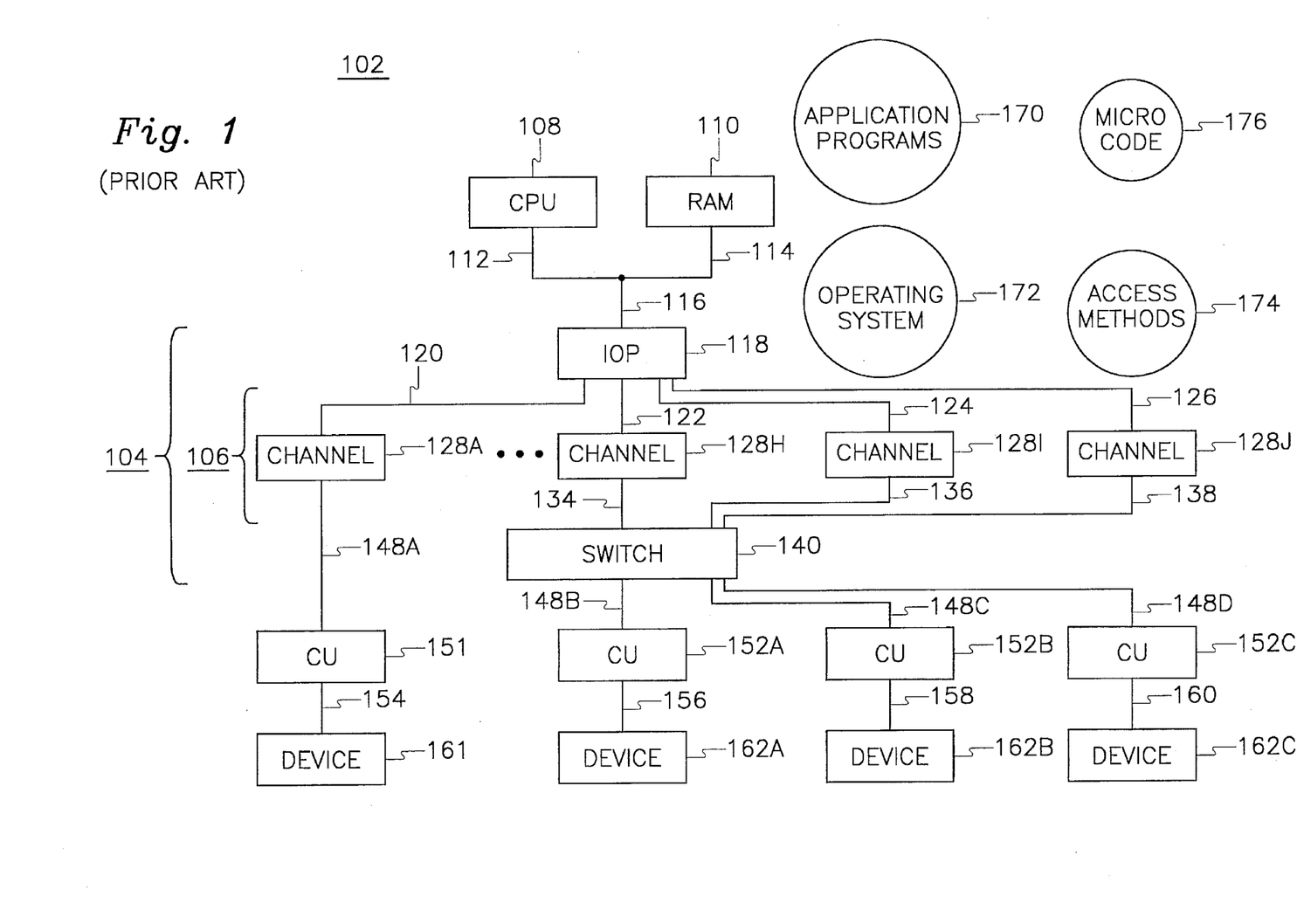
FIG. 1 illustrates a block diagram of a conventional computer system.

FIG. 1 is a block diagram of a conventional computer system 102. The computer system 102 includes a central processing unit (CPU) 108, a random access memory (RAM) 110, an input/output processor (IOP) 118, a channel subsystem 106 having multiple channels 128, a switch 140, multiple control units (CUs) 151, 152, and multiple peripheral devices 161; 162. The general structure and operation of these components are well known.

For clarity purposes, only one device 161, 162 is shown connected to each CU 151, 152 in FIGS. 1, 2, 3A, and 3B. Often, however, multiple devices 161, 162 are connected to each CU 151, 152.

The IOP 118, the channel subsystem 106, and the switch 140 are collectively called an input/output (IO) subsystem 104. The computer system 102 operates according to application programs 170, an operating system 172, access methods (or device drivers) 174, and microcode 176. The general structure and operation of the application programs 170, the operating system 172, the access methods 174, and the microcode 176 are well known.

The devices 161, 162 communicate with the CPU 108 and the RAM 110 via physical paths. As shown in FIG. 1, a limited number of physical paths exist between the devices 162 and the CPU 108 (or equivalently, between the devices 162 and the RAM 110). Specifically, in this example, there are three physical paths between the devices 162 and the CPU 108. These physical paths include the channels 128H, 128I, 128J, the switch 140, and the CUs 152. For example, one of the physical paths from the device 162A and the CPU 108 includes the channel 128I, the switch 140, and the CU 152A.

Ideally, the devices 162 and the CPU 108 may use all of the physical paths to communicate.

In the conventional computer system 102, however, the devices 162 are not permitted to use all of the physical paths. This is true because of the architecture, implementation, and initialization limits placed on the devices 162, which restrict the use of all the channels 128H, 128I and 128J. For example, during initialization of the computer system 102, the IO subsystem 104 may be configured such that the devices 162 may use only the channels 128H and 128I. Consequently, only two physical paths would be available for communication between the devices 162 and the CPU 108—the physical paths involving the channels 128H and 128I.

Figure 2:
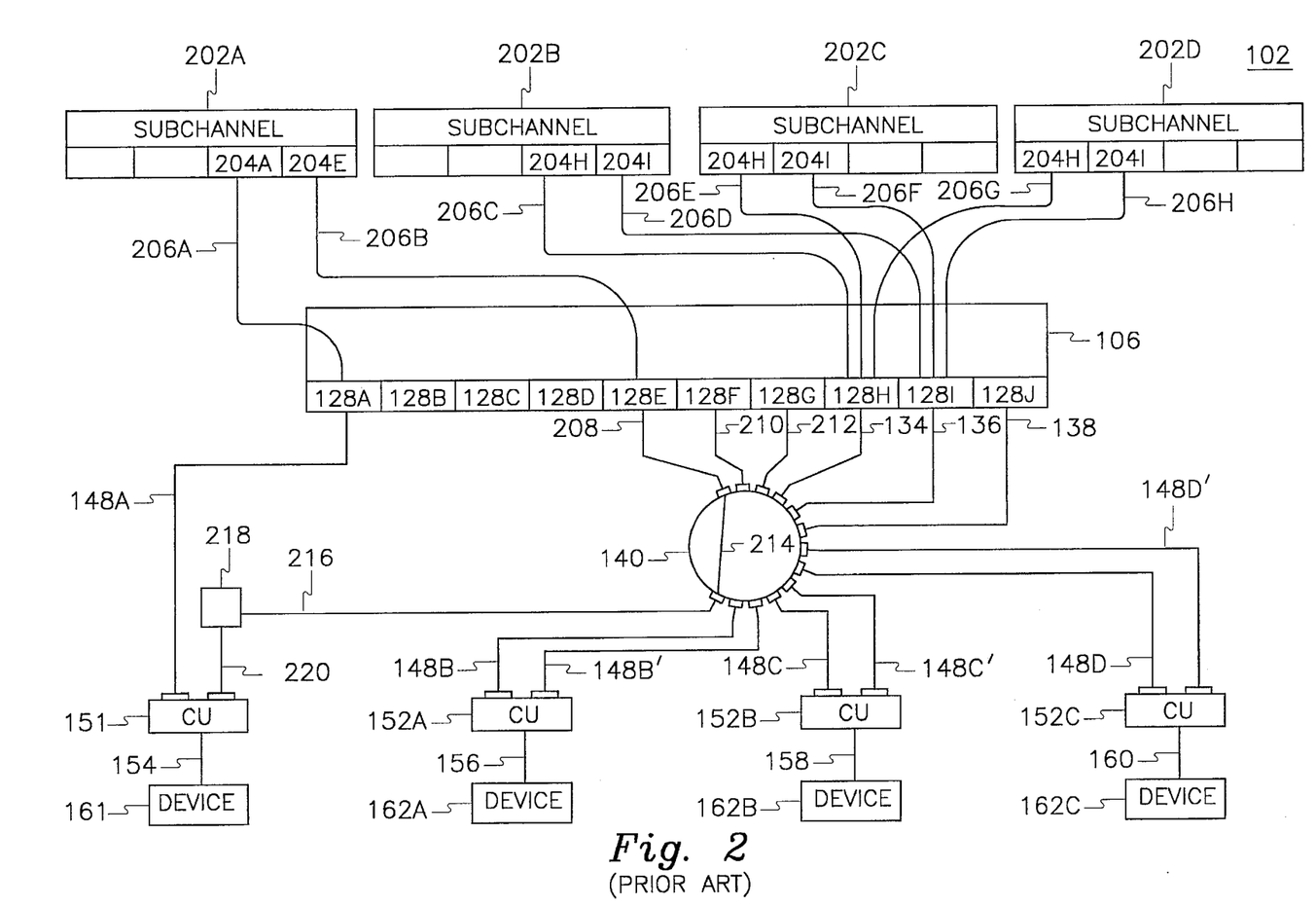
FIG. 2 illustrates the conventional computer system in greater detail.

FIG. 2 illustrates the conventional computer system 102 in greater detail (for clarity, FIG. 2 does not show the CPU 108, the RAM 110, or the IOP 118).

In the conventional computer system 102, a subchannel 202A, 202B, 202C, 202D is associated with each device 161, 162A, 162B, 162C, respectively. The subchannels 202 are tables which are stored in the RAM 110 or in an IOP-dedicated memory (not shown in FIG. 1). The subchannels 202 contain channel path identifiers (CHPIDs) 204.

The CHPIDs 204 are used to identify (that is, to address) the channels 128. For example, the CHPID 204A identifies the channel 128A. The CHPID 204I identifies the channel 128I. (In this patent document, the following convention is used: the CHPID 204x identifies the channel 128x.)

A CHPID 204 may identify only one channel 128. However, multiple subchannels 202 may identify the same channel 128. For example, the CHPIDs 204I in the subchannels 202B, 202C, 202D identify the channel 128I.

The CHPIDs 204 also are used to identify (that is, to address) physical paths between the devices 161, 162 and the CPU 108. For example, the subchannel 202B contains the CHPIDs 204H, 204I which identify the channels 128H, 128I, respectively. The subchannel 202B is associated with the device 162A. Thus, the CHPIDs 204H, 204I identify two physical paths between the device 162A and the CPU 108 —the physical paths including the channels 128H, 128I, the switch 140, and the CU 152A. Generally, multiple switches 140 may exist.

The IOP 118 references the subchannels 202 to access the devices 161, 162. Specifically, the IOP 118 references the CHPIDs 204 in the subchannels 202 to determine the channels 128 and the physical paths associated with the devices 161, 162. The IOP 118 then uses the determined physical paths to access the devices 161, 162 (that is, to allow communication between the devices 161, 162 and the CPU 108). Thus, the IOP 118 references the subchannels 202 to directly address the channels 128.

The subchannels 202 contain addresses of the devices 162 within their CUs 152. Link addresses of control unit interfaces are associated with the CHPIDs 204. The link addresses are the addresses to which the switch 140 makes its connections.

As shown in FIG. 2, there are five possible physical paths between the devices 162 and the CPU 108. These five possible physical paths include the channels 128F, 128G, 128H, 128I, 128J (note that both the devices 162 and the channels 128F, 128G, 128H, 128I, 128J are connected to the switch 140).

As noted above, however, the devices 162 are not permitted to use all of the physical paths. This is true because of the architecture, implementation, and initialization limits placed on the devices 162, which restrict the use of all the channels 128F, 128G, 128H, 128I and 128J. The devices 162 are not permitted to use all of the channels 128F, 128G, 128H, 128I, 128J because the subchannels 202 can store only a limited number of the CHPIDs 204.

Referring to the subchannels 202B, 202C, 202D in FIG. 2, the IO subsystem 104 is configured such that the devices 162 may use only the channels 128H and 128I. Consequently, only two physical paths are available for communication between the devices 162 and the CPU 108—the physical paths involving the channels 128H and 128I.

Because the devices 162 are not permitted to use all of the physical paths, the devices 162 may not be able to communicate with the CPU 108. For example, if the devices 162A, 162B are communicating over the channels 128H, 128I, then a physical path does not remain for the device 162C. Therefore, the device 162C cannot communicate with the CPU 108. This is true, even though the channels 128F, 128G, 128J may be idle.

Therefore, the conventional computer system 102 results in one or more of the devices 162 waiting to communicate on its assigned channels 128 while one or more unassigned channels 128 are often idle. Devices 162 waiting to communicate result in lower system performance and the idle channels 128 result in low channel utilization.

In a prior solution to the above problem, the subchannels 202 are modified to store additional CHPIDs 204. In FIG. 2, the subchannels 202 store four CHPIDs 204. Therefore, a maximum of four physical paths are available for each of the devices 161, 162. According to the prior solution, the subchannels 202 are modified to store eight CHPIDs 204. Therefore, a maximum of eight physical paths are available for each of the devices 161, 162.

However, the prior solution is wasteful because many devices 161, 162 require less than eight physical paths. For example, the device 161 is associated with two dedicated physical paths and thus requires only two CHPIDs 204A, 204E. However, the prior solution requires that all of the subchannels 202 be modified to store eight CHPIDs 204.

Therefore, the prior solution is flawed because it inefficiently consumes the RAM 108 and IOP-dedicated memory required to store the subchannels 202.

Further, the prior solution is flawed because it requires significant modifications to existing computer systems 102. For example, the subchannels 202 in the computer system 102 must be modified to store eight CHPIDs 204 in order to implement the prior solution.

Thus, a system and method for addressing channels are required which result in high channel utilization without inefficiently consuming memory and without requiring significant system modifications.

DISCLOSURE OF INVENTION

The present invention is directed to systems and methods for using logical channel groups to indirectly address channels in computer systems. By using logical channel groups, the present invention addresses the channels in a manner which results in high channel utilization without inefficiently consuming memory and without requiring significant system modifications.

This invention is also directed to systems and methods for dynamically routing messages through switches. Such dynamic routing improves communication throughput by reducing sequential connect requests.

Specifically, the present invention is directed to a computer system having a processor, a memory, and an input/output (IO) system for transferring information between devices and the processor.

The IO system includes channels, channel path identifiers for identifying the channels, logical channel groups having lists of the channel path identifiers, and subchannels having pointers to the logical channel groups.

The IO system also includes one or more switches for routing information between the channels and devices.

The present invention addresses a channel, and thereby establishes a communication link between the processor and a device, by first establishing a logical channel between the processor and the device. Then, one or more of the channels are associated with the logical channel. Then, a physical path via one of the associated channels is established between the processor and the device.

The logical channel is established between the processor and the device by identifying a subchannel associated with the device and then selecting one of the logical channel groups associated with the identified subchannel.

According to a first embodiment of the present invention, the physical path between the processor and the device is established by selecting one of the channels associated with the selected logical channel group. If the selected channel is not busy, then the selected channel is used to establish the physical path.

According to a second embodiment of the present invention, the physical path between the processor and the device is established by generating a busy vector for identifying busy channels; generating a mask vector for identifying optimized channels; generating a channel vector for identifying channels associated with the selected logical channel group; generating a result vector according to the busy vector, mask vector, and channel vector; analyzing the result vector to determine whether an available channel exists; and, if an available channel exists, then using the available channel to establish the physical path.

The available channel may represent an idle channel or an idle and optimized channel.

Each of the switches include multiple ports connected to the channels and devices, port identifiers for identifying the ports, path groups which store subsets of the port identifiers, and path group link addresses for identifying the path groups. Each of the path groups identify one or more ports which are connected to a common destination.

A physical path is established within the switch between one of the channels and one of the devices by first translating a destination address identifying a destination to a path group link address. The destination represents one of the channels or control units.

Then, the switch associates the path group link address with a path group, where the path group identifies one or more of the ports connected to the destination. The switch selects one of the associated ports and determines whether the selected port is busy. If the selected port is not busy, then the switch uses the selected port to establish the physical path.

The foregoing and other objects, features and advantages of the invention will be apparent from the following more particular description of the preferred embodiments of the invention, as illustrated in the accompanying drawings.

BRIEF DESCRIPTION OF DRAWINGS

The present invention will be described with reference to the accompanying drawings, wherein.

BEST MODE FOR CARRYING OUT THE INVENTION

Figure 3A:
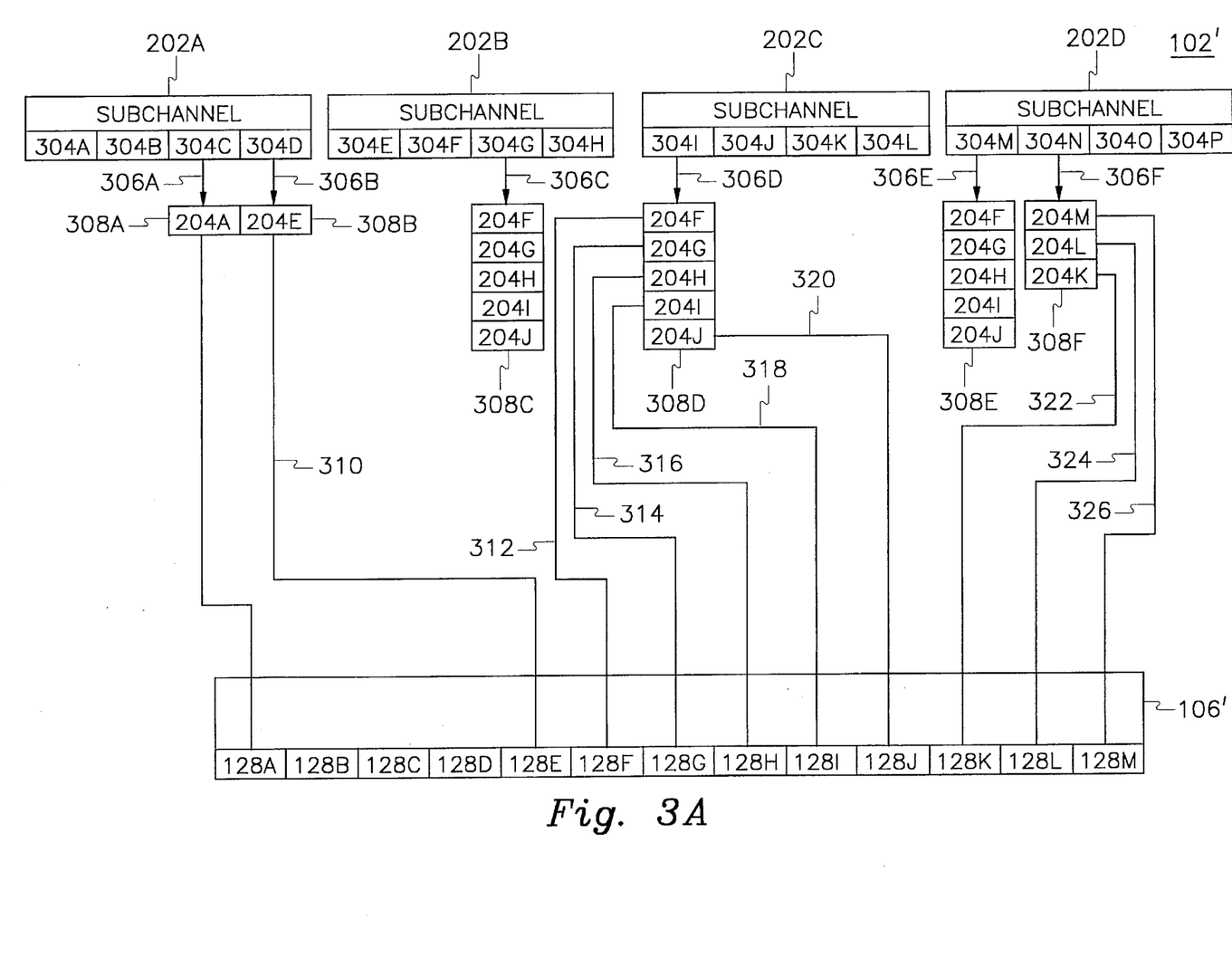
FIG. 3A and FIG. 3B collective illustrate a block diagram of a preferred embodiment of the present invention.
Figure 3B:
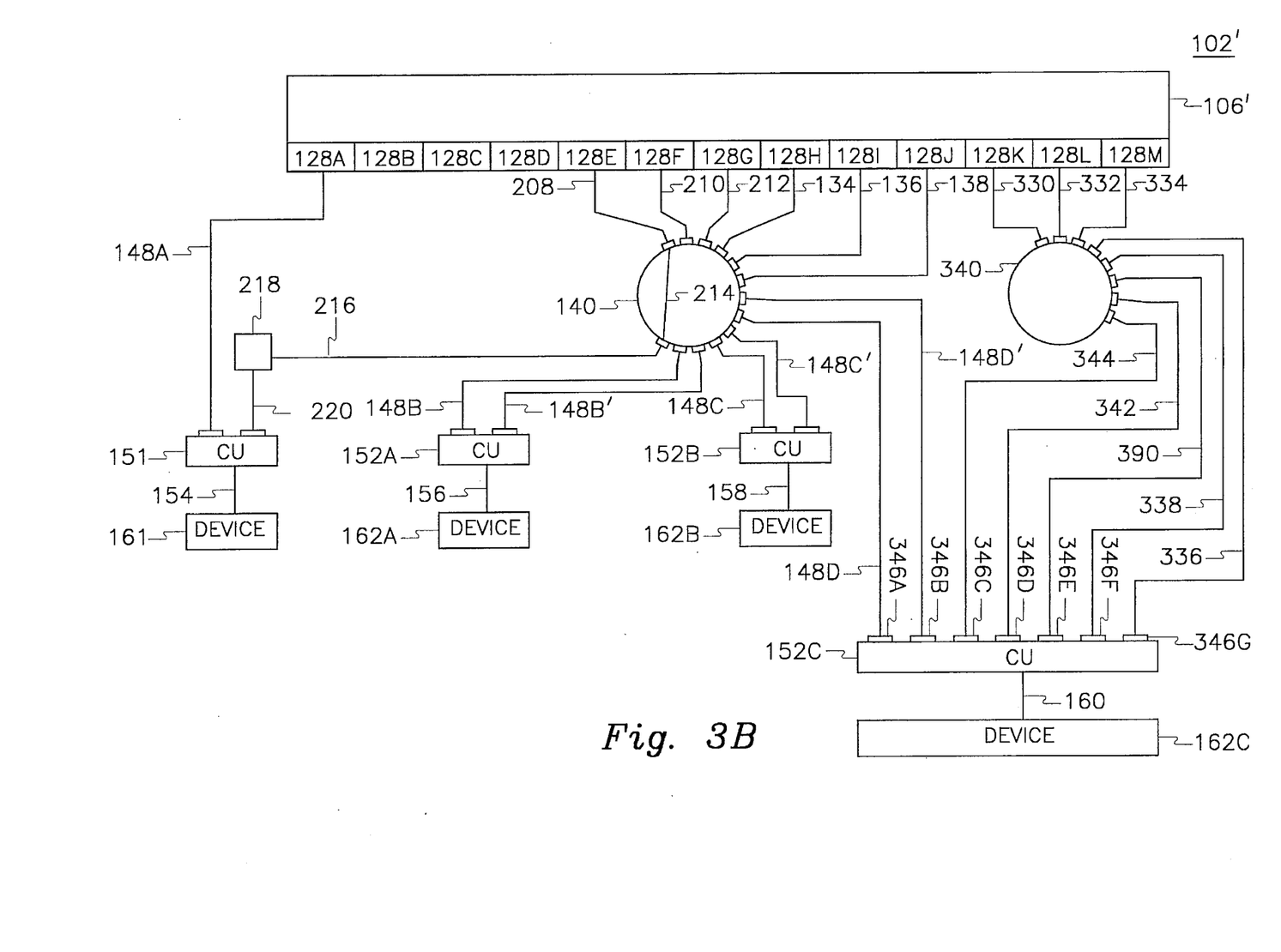

FIGS. 3A and 3B collectively illustrate a block diagram of a preferred embodiment of the present invention (note that FIGS. 3A and 3B share a common channel subsystem 106'). The preferred embodiment of the present invention includes a computer system 102'. The computer system 102' represents an improvement over the conventional computer system 102. The manner in which the computer system 102' is an improvement over the conventional computer system 102 is described below.

As shown in FIG. 3B, the computer system 102' of the present invention supports multiple switches 140, 340. The switch 140 has multiple ports, such as ports 208, 210, and 212. Similarly, the switch 340 has multiple ports, such as ports 330, 332, and 334.

In FIG. 3B, the CU 152C is connected to the switches 140 and 340. The CUs 152A and 152B are connected only to the switch 140. Note that the CUs 152, like the CU 152C, are often connected to multiple switches 140, 340.

According to a preferred embodiment of the present invention, the computer system 102' is an International Business Machines Corporation (IBM) System/390 computer. The operating system 172 is an IBM Enterprise Systems Architecture (ESA) capable operating system such as MVS/ESA or VM/ESA. The access methods 174 and the microcode 176 are written in a computer language that is appropriate for the IBM System/390 computer.

The switches 140, 340 are IBM 9032 or 9033 ESCON Directors.

The CU 151 is a parallel control unit, such as an IBM 3174, 3490, or 3990 parallel control unit. The computer system 102' includes a protocol converter 218. The protocol converter 218 is an IBM 9034 ESCON Converter. The CUs 152 are serial control units, such as IBM 3174, 3490, or 3990 ESCON capable control units..

The subchannels 202 are tables. In the computer system 102' of the present invention, the subchannels 202 do not store CHPIDs 204. Instead, the subchannels 202 store pointers 304 to logical channel groups 308. The logical channel groups 308 represent logical paths, or logical channels, between the devices 162 and the CPU 108 and RAM 110. In this patent document, devices (such as the CPU 108, RAM 110, and IOP 118) which communicate with the devices 162 are called active data units.

The logical channel groups 308 are tables. The logical channel groups 308 store lists of CHPIDs 204. Since the CHPIDs 204 address the channels 128 and physical paths, a single logical channel group 308 may represent multiple physical paths.

The CHPIDs 204 in a particular logical channel group 308 identify those channels 128 which are connected to the same switch 140, 340 and which provide connectivity to the same device 161, 162. For example, a logical channel group 308B associated with the switch 140 and the device 161 includes the CHPID 204E for the channel 128E. A logical channel group 308D associated with the switch 140 and the device 162B includes the CHPIDs 204F, 204G, 204H, 204I, 204J for the channels 128F, 128G, 128H, 128I, 128J. A logical channel group 308F associated with the switch 340 and the device 162C includes CHPIDs 204K, 204L, 204M for channels 128K, 128L, 128M.

According to the present invention, a physical path between the device 162C and the CPU 108 (or RAM 110) is identified by selecting a logical channel between the device 162C and the CPU 108 (the device 162C is used for illustrative purposes). Then, the selected logical channel is translated to a physical path between the device 162C and the CPU 108.

In other words, the IOP 118 accesses the subchannel 202D associated with the device 162C and selects one of the pointers 304M (the pointer 304M is used for illustrative purposes). This is equivalent to selecting a logical channel between the device 162C and the CPU 108. The IOP 118 uses the pointer 304M to access the logical channel group 308E. The IOP 118 selects one of the CHPIDs 204F, 204G, 204H, 204I, 204J in the logical channel group 308E. This is equivalent to translating the logical channel to a physical path, since the CHPIDs 204F, 204G, 204H, 204I, 204J identify the channels 128F, 128G, 128H, 128I, 128J and the physical paths. Thus, according to the present invention, the IOP 118 references the subchannels 202 in order to indirectly address the channels 128 and the physical paths.

By storing the pointers 304, the subchannels 202 are able to effectively store more CHPIDs 204 than if the subchannels 202 stored the CHPIDs 204 themselves. For example, as shown in FIG. 3A, the subchannel 202D effectively stores eight CHPIDs. The subchannel 202D could store only four CHPIDs 204 if the subchannel 202D stored the CHPIDs 204 themselves.

Since the subchannels 202 effectively store more CHPIDs 204, the subchannels 202 are able to specify more addresses 204 through which the channels 128 may be accessed. Equivalently, the subchannels 202 are able to specify more physical paths through which the devices 161, 162 may communicate with the CPU 108. For example, the subchannel 202D specifies eight physical paths over which the device 162C may communicate with the CPU 108—the physical paths involving the channels 204F, 204G, 204H, 204I, 204J, 204K, 204L, 204M.

Since the subchannels 202 specify more physical paths, the computer system 102' of the present invention results in high channel utilization and improved device response time compared to the conventional computer system 102.

Note that the computer system 102' of the present invention requires only minor modifications to the conventional computer system 102. Specifically, the subchannels 202 do not require modification in order to store the pointers 304.

Note also that the logical channel groups 308 may store any number of CHPIDs 204, as long as the CHPIDs 204 in a particular logical channel group 308 refer to the channels 128 which are connected to the same switch 140, 340 and which provide connectivity to the same device 161, 162.

The subchannels 202 and the logical channel groups 308 are stored in either the RAM 110 or the IOP-dedicated memory.

Figure 4A:
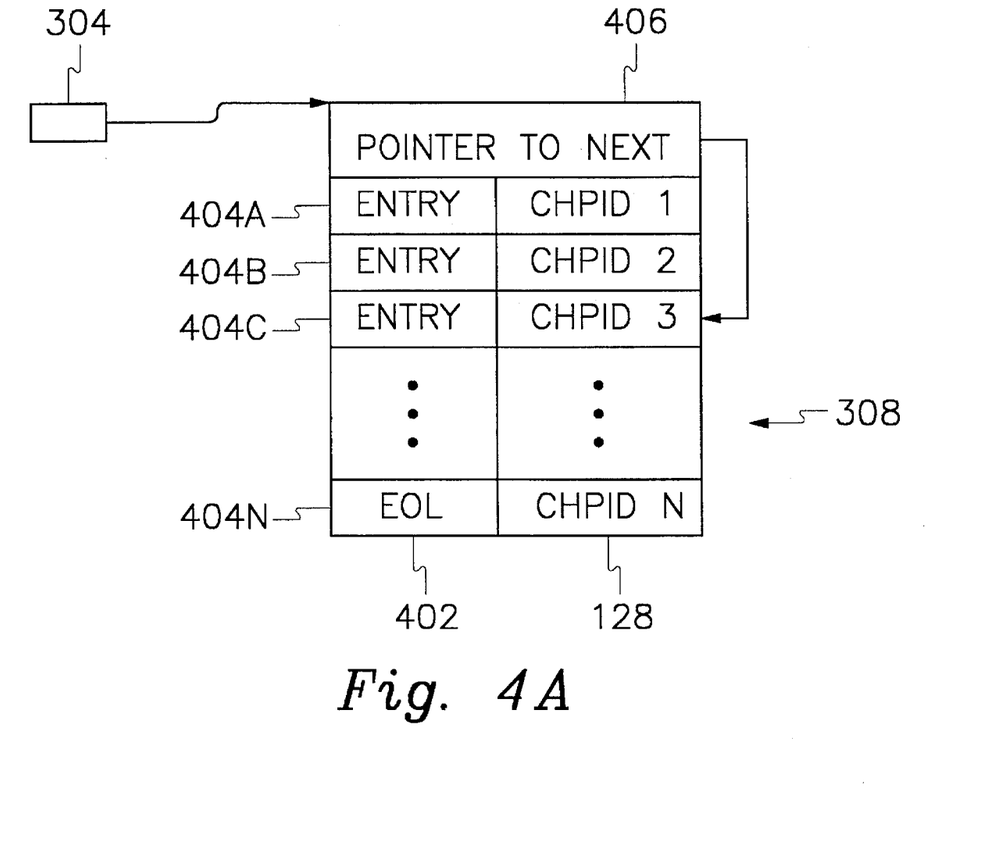
FIG. 4A illustrates a logical channel group implementation having multiple entries according to a first embodiment of the present invention.

The logical channel groups 308 may be implemented in a number of different ways. FIG. 4A illustrates a logical channel group 308 implementation according to a first embodiment of the present invention.

As shown in FIG. 4A, the logical channel group 308 is referenced by the pointer 304.

The logical channel group 308 contains an entry 404 for each CHPID 128. Thus, if the logical channel group 308 includes a list of ten CHPIDs 128, then the logical channel group 308 would include ten entries 404.

Each entry 404 stores a status 402 in addition to the CHPID 128. An "ENTRY" status indicates that the associated entry 404A, 404B, 404C is not the last entry 404N in the logical channel group 308. An "EOL" (end of list) status indicates that the associated entry 404N is the last entry 404N in the logical channel group 308.

The logical channel group 308 also contains a next pointer 406. The next pointer 406 points to one of the entries 404. The operation of the next pointer 406 is described below with reference to FIG. 5.

Figure 4B:
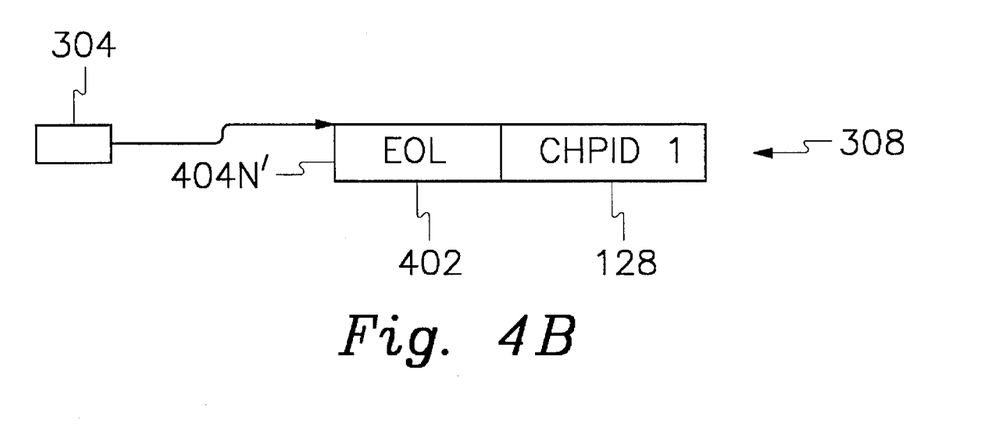
FIG. 4B illustrates a logical channel group implementation having a single entry according to the first embodiment of the present invention.

FIG. 4B illustrates a logical channel group 308 according to the first embodiment of the present invention. The logical channel group 308 has only one entry 404N'. When the first entry in a logical channel group 308 is also the last, signified by the EOL status, the I/O subsystem knows that this is a single entry. The pointer 304 and the logical channel group 308 in FIG. 4B correspond to the pointer 304D and the logical channel group 308B in FIG. 3A.

Figure 5:
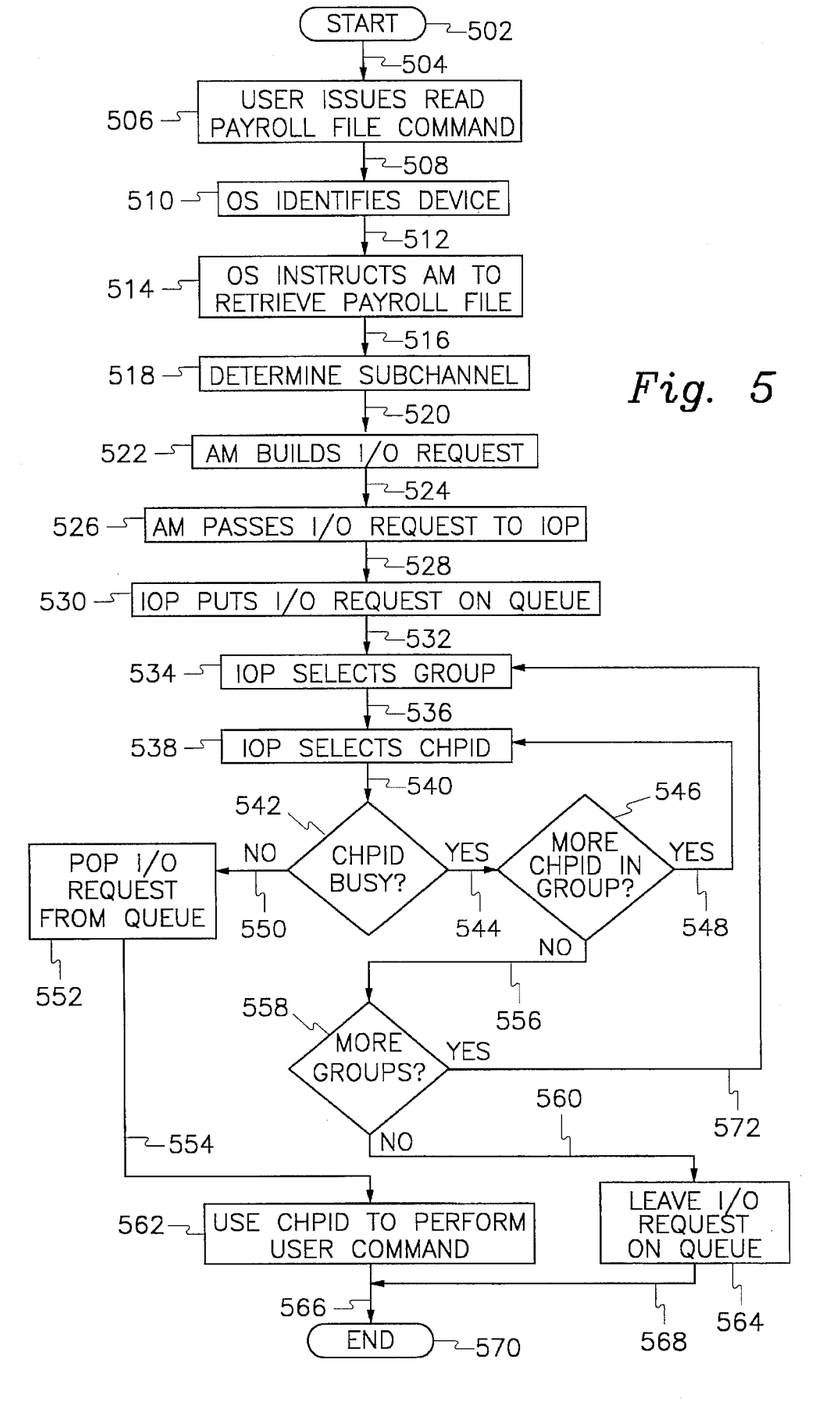
FIG. 5 illustrates a method of accessing devices according to the first embodiment of the present invention.

FIG. 5 illustrates a method of accessing the devices 161, 162 according to the first embodiment of the present invention. The method shown in FIG. 5, particularly the operation of the IOP 118 with regard to the logical channel group 308, is implemented in the microcode 176.

In step 506, a user (via the application program 170) issues a command to the operating system 172 to read a payroll file. (The use of the payroll file is solely for illustrative purposes.)

In step 510, the operating system 172 identifies a device 162 which contains the payroll file. For illustrative purposes, assume that the device 162C is a storage device which contains the payroll file. Then, the operating system 172 in step 510 identifies the device 162C.

In step 514, the operating system 172 instructs the access method 174 associated with the device 162C to retrieve the payroll file.

In step 518, the subchannel 202D associated with the device 162C is determined. Either the operating system 172 or the access method 174 may perform step 518.

In step 522, the access method 174 builds channel input/output (I/O) requests. In the preferred embodiment of the present invention, an I/O request includes one or more channel command words (CCWs) according to the user's read command. The general structure of the CCW is well known.

In step 526, the access method 174 passes the I/O request to the IOP 118.

In step 530, the IOP 118 places the I/O request on a queue.

In step 534, the IOP 118 selects the I/O request from the queue. The IOP 118 then operates to select a physical path over which the device 162C can communicate with the CPU 108 and the RAM 110. To select a physical path, the IOP 118 accesses the subchannel 202D associated with the device 162C and selects one of the available logical channel groups 308. The IOP 118 selects the logical channel group 308 according to some selection strategy, such as a fairness selection strategy (which operates to equalize work among the channels 128).

As shown in FIG. 3A, the subchannel 202D has two available logical channel groups 308E, 308F. Assume that the IOP 118 selects the logical channel group 308E in step 534.

In step 538, the IOP 118 selects one of the CHPIDs 204 in the logical channel group 308E selected in step 534. The IOP 118 selects the CHPID 128 which is contained in the entry 404C that is referenced by the next pointer 406. The next pointer 406 is positioned to point to the entries 404 according to some selection strategy, such as the fairness selection strategy. Assume that the IOP 118 selects the CHPID 204H in step 538.

In step 542, the IOP 118 determines whether the CHPID 204H selected in step 538 is busy. If the CHPID 204H is busy, then in step 546 the IOP 118 determines whether unprocessed CHPIDs 204 remain in the logical channel group 308E selected in step 534.

If unprocessed CHPIDs 204 remain, then the IOP 118 loops to step 538 to select one of the unprocessed CHPIDs 204.

If unprocessed CHPIDs 204 do not remain, then in step 558 the IOP 118 determines whether unprocessed logical channel groups 308 remain in the subchannel 202D.

If unprocessed logical channel groups 308 remain, then the IOP 118 loops to step 534 to select one of the unprocessed logical channel groups 204.

If unprocessed logical channel groups 308 do not remain, then all physical paths associated with the device 162C are busy. In step 564, the IOP 118 leaves the I/O request on the queue.

In step 542, if the CHPID 204H selected in step 538 is not busy, then in step 552 the IOP 118 pops the I/O request from the queue.

In step 562, the IOP 118 uses the CHPID 204H selected in step 538 to process the user's read command according to the popped I/O request. Specifically, the IOP 118 uses the physical path identified by the CHPID 204H (that is, the physical path involving the channel 128H, the switch 140, and the CU 152C) to allow communication between the device 162C and the CPU 108 and the RAM 110.

Figure 6:
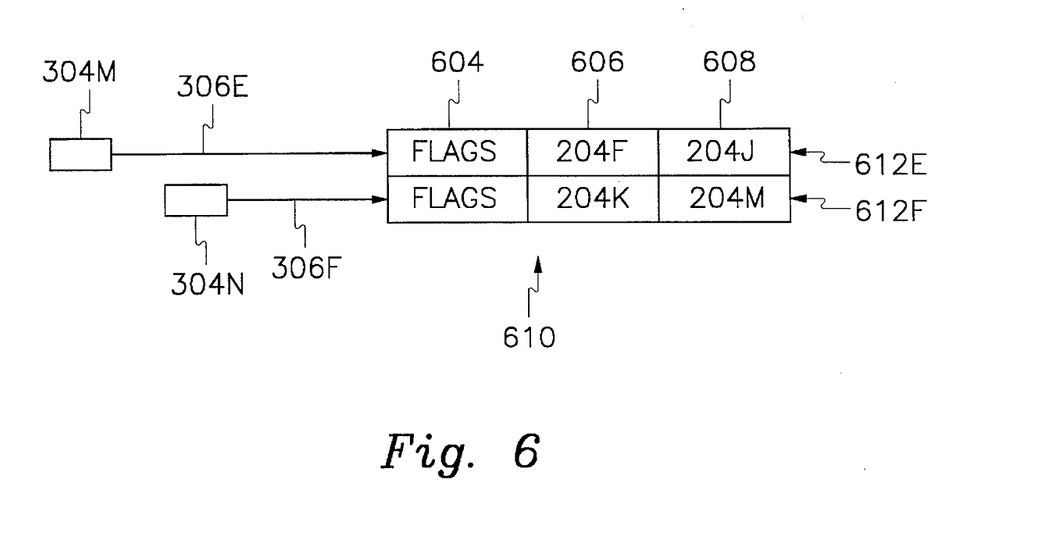
FIG. 6 illustrates a logical channel group implementation according to a second embodiment of the present invention.

FIG. 6 illustrates a logical channel group 308 implementation according to a second embodiment of the present invention. The second embodiment of the present invention requires that the logical channel groups 308 contain logically sequential CHPIDs 204, such as the CHPIDs 204F, 204G, and 204H. The logical channel groups 308 may not contain non-sequential CHPIDs 204, such as the CHPIDs 204F and 204H (without the CHPID 204G).

According to the second embodiment of the present invention, a logical channel group table 610 exists for each subchannel 202. For example, the logical channel group table 610 shown in FIG. 6 is associated with the subchannel 202D.

The logical channel group table 610 contains an entry 612E, 612F for each logical channel group 308E, 308F of the associated subchannel 202D. (In this patent document, an entry 612x in the logical channel group table 610 corresponds to a logical channel group 308x.) The entries 612E, 612F are referenced by the appropriate pointers 304M, 304N from the subchannel 202D.

Each entry 612 contains a flag field 604, a first CHPID field 606, and a last CHPID field 608.

The first CHPID field 606 and the last CHPID field 608 identify the range of the CHPIDs 204 contained in the associated logical channel group 308. For example, the entry 612E is associated with the logical channel group 308E of the subchannel 202D. The logical channel group 308E contains the CHPIDs 204F, 204G, 204H, 204I, and 204J. In other words, the logical channel group 308E contains a range of the CHPIDs 204 from the CHPID 204F to the CHPID 204J. Therefore, as shown in FIG. 6, the first CHPID field 606 of the entry 612E is 204F and the last CHPID field 608 of the entry 612E is 204J.

The flag field 604 contains information regarding the optimal use of the channels 128. Specifically, the flag field 604 of an entry 612 indicates whether the channels 128 associated with the entry 612 are optimized for "start channel," "reconnect channel," or other types of operation Such channel optimization is described below.

The operation of the computer system 102' may be improved if the channels 128 are optimized for specific types of operation. For example, all the channels 128 are fully functional. However, the channels 128F through 128I may be optimized to perform "start channel" commands (for example, to send a "read file" command to the device 161, 162). The channels 128J through 128M may be optimized to perform "reconnect channel" commands (for example, to send information from the device 161, 162 to the CPU 108 or the RAM 110 in response to the "read file" command). Such channel optimization is not possible in conventional computer systems 102. This is true because the subchannels 202 are able to store only limited numbers of CHPIDs 204. However, such channel optimization is possible in the computer system 102' of the present invention. This is true because the logical channel groups 308 allow the subchannels 202 to effectively store a large number of CHPIDs 204.

Figure 7:
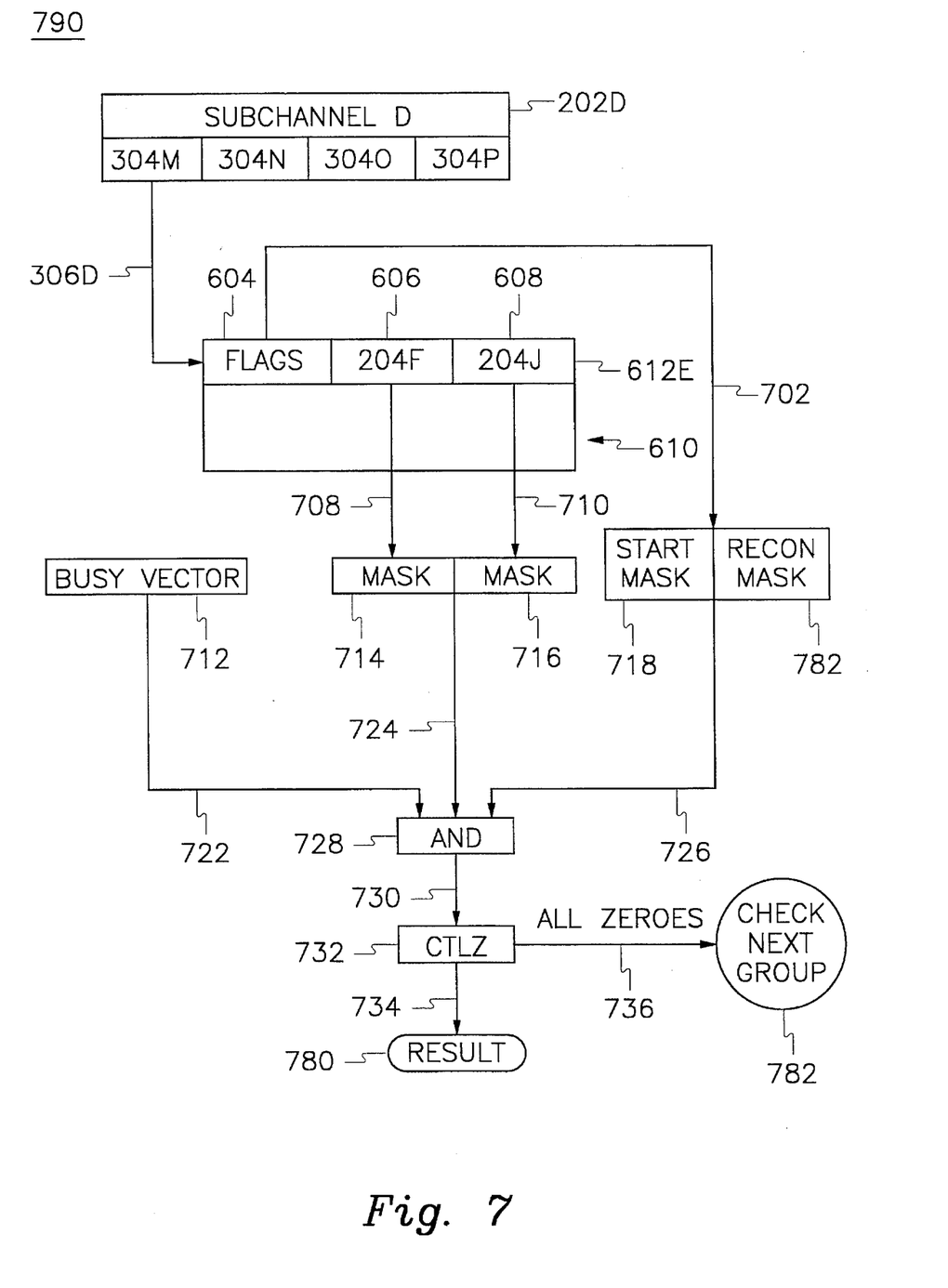
FIG. 7 illustrates a subsystem which is used to access devices according to the second embodiment of the present invention.

FIG. 7 illustrates a subsystem 790 of the computer system 102'. The subsystem 790 is used to access the devices 161, 162 according to the second embodiment of the present invention.

The subsystem 790 includes a busy vector 712 for indicating the channels 128 which are busy.

The subsystem 790 also includes a start mask 718 and a recon mask 782. The start mask 718 indicates those channels 128 which are optimized to perform "start channel" operations. The recon mask 718 indicates those channels 128 which are optimized to perform "reconnect channel" operations. The start and recon masks 718, 782 are set according to information in the flag field 604.

The subsystem 790 also includes mask registers 714,716 for creating a channel vector. The channel vector has the same length as the busy vector 712. The channel vector identifies the CHPIDs 204 that are indicated by the appropriate first and last CHPID fields 606, 608.

The subsystem 790 further includes AND gate 728. The AND gate 728 performs a logical AND operation on the busy vector 712, the channel vector, and the start or recon masks 718, 782. For reference purposes, the output of the AND gate 728 is called a result vector (also called an AND result).

The subsystem 790 also includes a count leading zeroes (CTLZ) circuitry 732. The CTLZ 732 scans through the result vector to locate the first non-zero value. The CTLZ 732 may start at either the left-most bit or the right-most bit of the result vector.

The busy vector 712, the masks 714, 716, the start/recon mask 718, the AND gate 728, and the CTLZ 732 may be implemented using existing technology.

Figure 8:
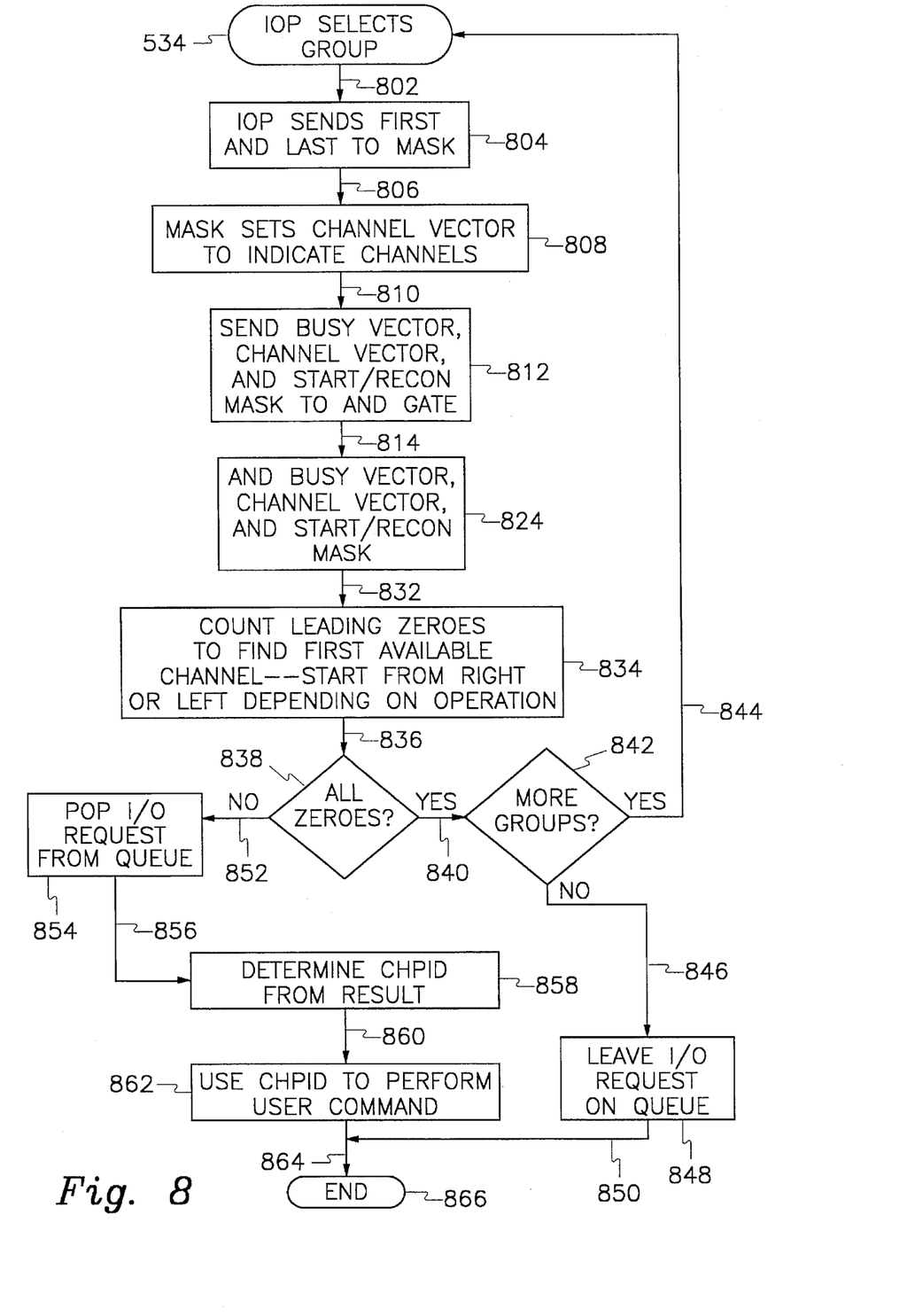
FIG. 8 illustrates a method for selecting a physical path over which devices may communicate according to the second embodiment of the present invention.

FIG. 8 illustrates a method for selecting a physical path over which the device 162C can communicate with the CPU 108 and the RAM 110. The method shown in FIG. 8 implicitly includes steps 502 through 534 of the flowchart shown in FIG. 5.

Recall that in step 534, the IOP 118 selected the logical channel group 308E. As shown in FIG. 6, the entry 612E in the logical channel group table 610 is associated with the logical channel group 308E.

In step 804, the IOP 118 sends the CHPIDs 204F, 204J in the first and last CHPID fields 606, 608 of the entry 612E to the masks 714, 716.

In step 808, the masks 714, 716 create the channel vector. The channel vector has the same length as the busy vector 712. The channel vector identifies the CHPIDs 204 that are indicated by the appropriate first and last CHPID fields 606, 608.

For example, suppose the computer system contains 16 channels 128 such that the CHPIDs 204 are represented by 4-bit numbers. The CHPID 204A is represented by 0000. The CHPID 204F is represented by 0101 and the CHPID 204J is represented by 1001. The masks 714, 716 would create the following channel vector from the CHPID 204F (from the first CHPID field 606) and the CHPID 204J (from the last CHPID field 608): 0000 0011 1110 0000. In the channel vector, the least significant bit (that is, the right-most bit) corresponds to the channel 128A. A "1" indicates that the corresponding channel 128 is present in the range established by the first and last CHPID fields 606, 608 of the entry 612E selected in step 534.

In step 812, the IOP 118 sends the busy vector 712, the channel vector, and the start or recon masks 718, 782 to the AND gate 728. When performing "start channel" operations, the IOP 118 sends the start mask 718 to the AND gate 728. When performing "reconnect channel" operations, the IOP 118 sends the recon mask 782 to the AND gate 728. For illustrative purposes, assume that the busy vector 712 equals the following: 0001 1110 0111 0110, wherein a "0" indicates that the corresponding channel 128 is busy. Also assume that the IOP 118 is performing a "start channel" operation, and the start mask 718 equals the following: 0000 0000 1111 1111, wherein a "1" indicates that the corresponding channel 128 is optimized to perform "start channel" operations. The recon mask 782 equals the following: 1111 1111 0000 0000, wherein a "1" indicates that the corresponding channel 128 is optimized to perform "reconnect channel" operations.

In step 824, the AND gate 728 performs a logical AND operation on the busy vector 712, the channel vector, and the start or recon masks 718, 782. According to the scenario described above, the AND gate 728 generates the following AND result: 0000 0000 0110 0000, wherein a "1" indicates that (1) the corresponding channel 128 is within the range established by the first and last CHPID fields 606, 608 of the entry 612E selected in step 534; (2) the corresponding channel 128 is not busy; and (3) the corresponding channel 128 is optimized to perform "start channel" operations.

In step 834, the CTLZ 732 scans the AND result to find and select a "1." Specifically, the CTLZ 732 either (1) starts at the right-most bit and moves left, bit-by-bit, until the first "1" is found, or (2) starts at the left-most bit and moves right, bit-by-bit, until the first "1" is found.

The operation of the CTLZ 732 may be optimized if the "start channel"-optimized channels are all assigned low CHPIDs 204 and the "reconnect channel"-optimized channels are all assigned high CHPIDs 204, or visa versa.

When the "start channel"-optimized channels and the "reconnect channel"-optimized channels are assigned CHPIDs 204 as described in the previous paragraph, then the CTLZ 732 may intelligently select the manner in which to scan the AND result. For example, in the present example, the start mask 718 equals 0000 0000 1111 1111 and the recon mask 782 equals 1111 1111 0000 0000 (thus, the "start channel"-optimized channels are assigned low CHPIDs 204 and the "reconnect channel"-optimized channels are assigned high CHPIDs 204). For "start channel" operations, the CTLZ 732 starts at the right-most bit. By starting at the right-most bit, the CTLZ 732 will more quickly locate the first "1". For similar reasons, the CTLZ 732 starts at the left-most bit for "reconnect channel" operations.

According to the scenario described above, the CTLZ 732 starts at the right-most bit and finds an "1" in the 5th position (wherein the right-most bit is the 0th position). The "1" in the 5th position corresponds to the channel 128F having the CHPID 204F.

In step 838, the IOP 118 determines whether the AND result contained all zeroes. If the AND result contains all zeroes, then the IOP 118 knows that the channels 204F, 204G, 204H, 204I, 204J (which are in the logical channel group 308E that was selected in step 534) are either busy or not optimized for "start channel" operations, or both.

If the AND result contains all zeroes, then in step 842 the IOP 118 determines whether unprocessed logical channel groups 308 remain in the subchannel 202D. The IOP 118 makes this determination in step 842 by referring to the logical channel group table 610.

In an alternative embodiment of the present invention, the IOP 118 scans all logical channel groups 308 in parallel using any existing or new parallel processing techniques. Based on the discussion contained herein, it will be obvious to those skilled in the art to modify the flowchart in FIG. 8 according to this alternative embodiment where the IOP 118 scans all logical channel groups 308 in parallel.

If unprocessed logical channel groups 308 remain in the subchannel 202D, then the IOP 118 loops back to step 534 in order to select one of the unprocessed logical channel groups 308.

If unprocessed logical channel groups 308 do not remain, then in step 848 the IOP 118 leaves the I/O request on the queue.

In step 838, if the AND result did not contain all zeroes, then in step 854 the IOP 118 pops the I/O request from the queue.

In step 858, the IOP 118 determines the CHPID 204F which corresponds to the "1" in the AND result which the CTLZ 732 found in step 834.

In step 862, the IOP 118 uses the CHPID 204F determined in step 858 to process the user's read command according to the popped I/O request. Specifically, the IOP 118 uses the physical path identified by the CHPID 204F (that is, the physical path involving the channel 128F, the switch 140, and the CU 152C) to allow communication between the device 162C and the CPU 108 and the RAM 110.

Note that, according to the second embodiment of the present invention, only unbusy and optimized channels 128 are used for communication between the devices 162 and the CPU 108 and RAM 110. Based on the discussion contained herein, it will be obvious to those skilled in the art to modify the structure of the subsystem 790 and the method in FIG. 8 so that unbusy and optimized channels 128 are used if such channels 128 are available. However, if such channels 128 are unavailable, then unbusy and unoptimized channels are used for communication between the devices 162 and the CPU 108 and RAM 110.

According to both the first and second embodiments of the present invention, messages are dynamically routed through the switches 140, 340. The switches 140, 340 of the present invention are described in detail below.

According to the present invention, the switches 140, 340 maintain routing tables. The routing tables store path groups and path group link addresses (PGLAs). The routing tables are stored in a memory, such as the RAM 110 or switch-dedicated memories.

The path groups store lists of ports (such as 208, 210, and 212) which are connected to channels 128. The path groups also store lists of ports (such as 148B, 148C, and 148D) which are connected to devices 162 via CUs 152. For example, with regard to the switch 140, a path group associated with the CU 152A may include ports 148B and 148B'. A path group associated with the CU 152C may include port 148D.

Additionally, with regard to the switch 140, a path group may contain ports 210, 212, 134, 136, and 138 corresponding to the channels 128F, 128G, 128H, 128I, 128J. This path group is appropriate for referring to the logical channel groups 308C, 308D, and 308E.

According to the present invention, a connect request specifying a path group from a channel 128 can be satisfied by any non-busy port (connected to a CU 152) in the specified path group. Similarly, a reconnect request specifying a path group from a CU 152 can be satisfied by any non-busy port (connected to a channel 128) in the specified path group. Thus, if there is a non-busy destination in the specified path group, then the connection will be made with only a single connect request rather than requiring that each separate destination be interrogated until a non-busy one is found. Similarly, a switch-busy response to the connect request means that all destinations in the path group are busy. The I/O request is not placed back on the queue unless all path groups on all switches 140, 340 are busy.

The PGLAs identify the path groups. All paths to a CU 152 in a given path group (that is, attached to ports in a given path group) on the same switch 140, 340 are assigned the same PGLA. All paths to a channel 128 in a given path group (that is, attached to ports in a given path group) on the same switch 140, 340 are assigned the same PGLA.

The PGLAs are used as addresses to route information through the switches 140, 340 to destinations.

For example, suppose a path group containing ports 148B and 148B' is identified by X, where X is a PGLA. The IOP 118 may refer to X in order to route information through the switch 140 to the CU 152A.

Also, suppose a path group containing ports 210, 212, 134, 136, and 138 is identified by Y, where Y is a PGLA. The CUs 152 may refer to Y to route information through the switch 140 to the logical channel groups 308C, 308D, and 308E (that is, to route information through the switch 140 to the physical paths defined by the logical channel groups 308C, 308D, and 308E).

Table 1 illustrates a routing table for the switch 140. Based on the discussion contained herein, the structure and contents of a routing table for the switch 340 should be obvious to those skilled in the art.

| PGLA A | PGLA B | PGLA C | PGLA D |
| --- | --- | --- | --- |
| 210 | 148B | 148C | 148D |
| 212 | 148B' | 148C' | 148D' |

-continued

| PGLA A | PGLA B | PGLA C | PGLA D |
|--------|--------|--------|--------|
| 134    |        |        |        |
| 136    |        |        |        |
| 138    |        |        |        |

Note that the routing table in Table 1 is source independent. For example, all sources who are transmitting to the CU 152A use PGLA B.

According to an alternate embodiment of the present invention, the switches 140, 340 maintain routing tables which are source dependent. Such a routing table for the switch 140 is shown in Table 2.

| Source | PGLA A | PGLA B | PGLA C |
|--------|--------|--------|--------|
| A      | 148B   | 148C   | 148D   |
|        | 148B'  | 148C'  |        |
| B      | 148B   | 148C   | 148D   |
|        |        | 148C'  | 148D'  |

As shown in Table 2, the contents of path groups depend on the source. For example, for Source A, PGLA A contains 148B and 148B'. For Source B, PGLA A contains only 148B. Thus, when Source A transmits to the CU 152A, either port 148B or 148B' may be used. However, when Source B transmits to the CU 152A, only port 148B may be used.

Figure 9:
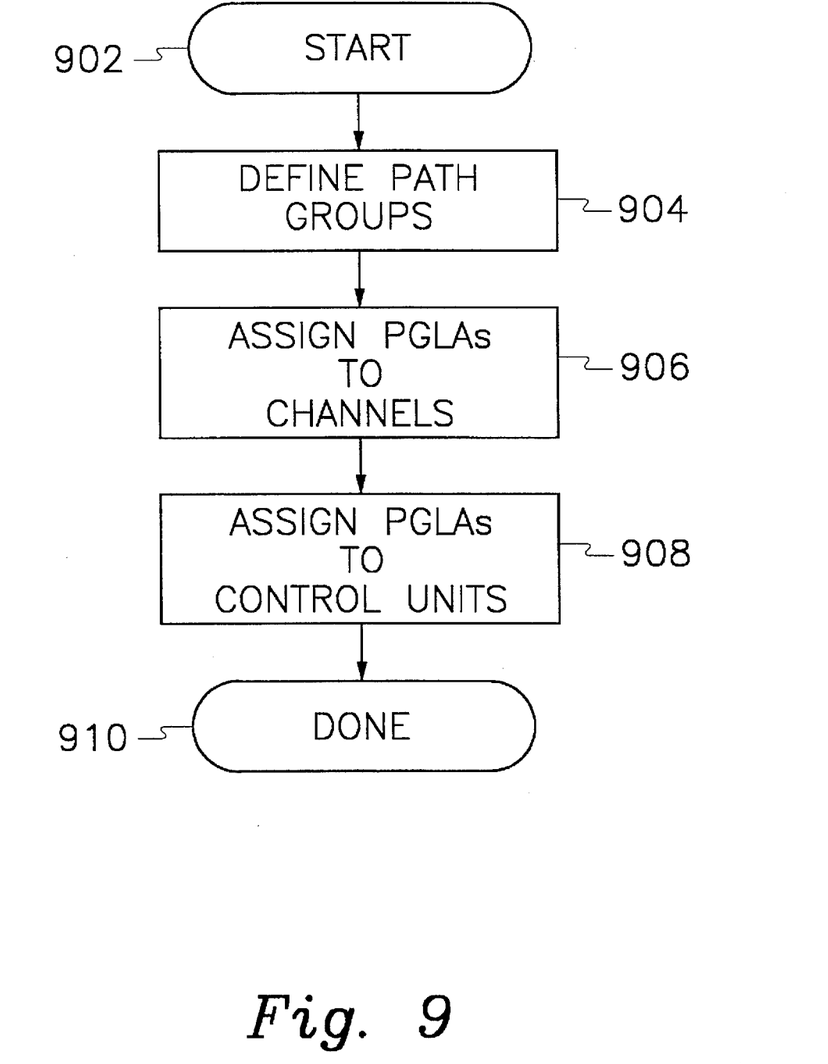
FIG. 9 illustrates a method for initializing routing tables.

FIG. 9 illustrates the manner in which the PGLAs, path groups, and routing tables are initialized. Such initialization may occur during system initialization or subsequently. The following discussion is applicable for both routing table embodiments shown in Tables 1 and 2.

In step 904, path groups are defined for each switch 140, 340. A system wishing to define a path group issues a DEFINE PGLA command to the switch 140, 340 where the path group is to be defined. The DEFINE PGLA command specifies the ports to be in the path group. In response to the DEFINE PGLA command, the switch 140, 340 sets up the path group (by creating an entry in its routing table) and returns a PGLA for the path group.

The DEFINE PGLA command is issued separately for the channels 128 and the control units 152 such that distinct PGLAs are created.

In step 906, the IOP 118 assigns the path group link addresses to the channels 128. Specifically, the IOP 118 inserts the PGLAs associated with the channels 128 into the link level facilities of all participating channels 128.

Additionally, during step 906, the channels 128 are informed of the PGLAs associated with the CUs 152.

In step 908, the IOP 118 assigns the path group link addresses to the CUs 152. Step 908 is performed using an ASSIGN PGLA function. The IOP 114 uses the ASSIGN PGLA function to cause the link level facilities of the CUs 152 to adopt the PGLAs associated with the CUs 152.

Additionally, during step 908, the CUs 152 are informed of the PGLAs associated with the channels 128.

Figure 10:
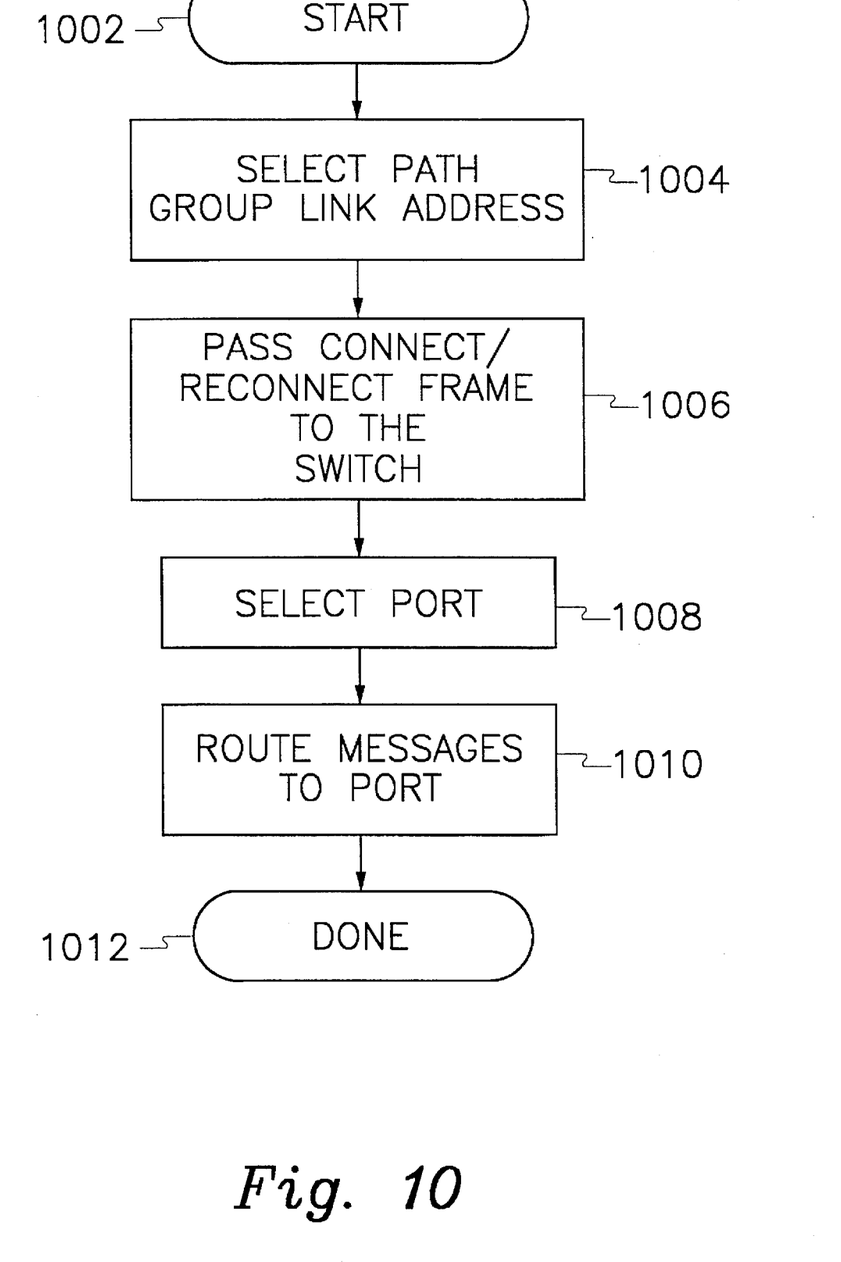
FIG. 10 illustrates the operation of switches 140, 340.

FIG. 10 illustrates the operation of the switches 140, 340 according to the present invention. The operation of the switches 140, 340 is the same for (1) messages being transmitted from the channels 128 to the CUs 152, and (2) messages being transmitted from the CUs 152 to the channels 128.

For illustrative purposes, assume that the IOP 118 is executing a "start channel" operation with the channel 128F, wherein the CU 152B is the destination. "Start channel" operations are specified with connect frames. Similarly, "reconnect channel" operations are specified with reconnect frames.

In step 1004, the IOP 118 selects a PGLA associated with the physical destination address (that is, CU 152B). For illustrative purposes, assume that the IOP 118 selects PGLA C (for example, see Table 1).

In step 1006, the IOP 118 sends the connect frame, which contains the PGLA for the destination (that is, PGLA C) and information to identify the source (that is, the channel 128F), to the switch 140 via the channel 128F.

In step 1008, in response to the connect frame, the switch 140 refers to its routing table to select an unbusy port associated with the PGLA for the destination (that is, PGLA C). Referring to Tables 1 and 2, the switch 140 selects between the ports 148C and 148C'. This is true, notwithstanding the routing table embodiment that is used. For illustrative purposes, assume that the switch 140 selects the port 148C.

In step 1010, once the channel 128F has been started, the switch 140 routes all subsequent messages from the channel 128F to the CU 152B via the port 148C.

A possible limitation of the present invention as described above relates to the fact that a single channel 128 or CU 152 may have to participate in more than one path group. Since different combinations of CUs 152 may be involved in different path groups, a single PGLA may not suffice. Based on the discussed contained herein, however, it should be obvious to those skilled in the art to extend the present invention to have a channel or CU link level facility recognize multiple PGLAs. Such extension would not require changes to the path group function in the switches 140, 340 as described above.

While the invention has been particularly shown and described with reference to preferred embodiments thereof, it will be understood by those skilled in the art that the foregoing and other changes in form and details may be made therein without departing from the spirit and scope of the invention.

We claim:

1. In a computer system comprising a plurality of channels, an active data unit, and one or more peripheral devices, an IO subsystem for establishing physical paths between the active data unit and the peripheral devices using the channels, the subsystem comprising:

a plurality of channel path identifiers for identifying the channels;

a computer memory having a finite storage capacity;

a plurality of logical channel groups comprising lists that store channel path identifiers, said lists stored in said computer memory, said lists storing varying numbers of channel path identifiers, said lists having a storage capacity that is limited only by said finite storage capacity of said computer memory; and a plurality of subchannels each exclusively assigned to one of said peripheral devices, each of said subchannels maintaining one or more pointers, each of said pointers addressing one of said logical channel groups.

2. The subsystem of claim 1, wherein ranges of said channel path identifiers are represented by first channel path identifiers and last channel path identifiers.

3. The subsystem of claim 2, wherein each of said logical channel groups comprises:

one of said first channel path identifiers;

one of said last channel path identifiers; and flag means for identifying optimized channels, wherein said optimized channels represent channels which are each optimized to perform a particular function.

4. The subsystem of claim 3, further comprising:

busy means for identifying busy channels;

first mask means, coupled to said flag means, for identifying said optimized channels;

second mask means for generating a channel vector according to one of said ranges represented by said first channel path identifier and said last channel path identifier;

AND means, coupled to said busy means, first mask means, and second mask means, for generating a result vector;

CTLZ means, coupled to said AND means, for analyzing said result vector to determine whether an available channel exists; and means for using said available channel to establish one of said physical paths if said available channel exists.

5. The subsystem of claim 4, wherein said AND means comprises means for specifying idle channels within said range by AND'ing said busy vector and channel vector.

6. The subsystem of claim 5, wherein said available channel comprises one of said idle channels within said range.

7. The subsystem of claim 4, wherein said AND means comprises means for specifying idle and optimized channels within said range by AND'ing said busy vector, mask vector, and channel vector.

8. The subsystem of claim 7, wherein said available channel comprises one of said idle and optimized channels within said range.

9. The subsystem of claim 4, wherein said CTLZ means comprises:

means for scanning said result vector in a first direction if a START CHANNEL operation is being performed; and means for scanning said result vector in a second direction if a RECONNECT CHANNEL operation is being performed.

10. The subsystem of claim 1, wherein each pointer maintained by each subchannel addresses a logical channel group storing channel path identifiers that identify channels that are connected to a peripheral device assigned to said each subchannel.

11. The subsystem of claim 1 in which the system includes switches connected to said peripheral devices and said channels, wherein the channel path identifiers in any one of said logical channel groups identify channels which are electrically coupled to a particular one of said peripheral devices via a particular one of said switches.

12. In a computer system having an active data unit, a plurality of channels, and a plurality of peripheral devices, a method for establishing a communication link between the active data unit and one of the peripheral devices, the method comprising the steps of:

(1) establishing a logical channel between the active data unit and the peripheral device;

(2) associating one or more of said channels with said logical channel; and (3) establishing a physical path via one of said associated channels between the active data unit and the peripheral device;

wherein step (1) comprises the steps of:

(a) identifying a subchannel associated with the peripheral device, wherein said subchannel includes pointers that address logical channel groups, said logical channel groups comprising lists that store channel path identifiers that identify channels, said lists stored in a computer memory, said lists storing varying numbers of channel path identifiers, said lists having a storage capacity that is limited only by a storage capacity of the computer memory; and (b) selecting one of said logical channel groups.

13. The method of claim 12, wherein step (2) comprises the step of:

selecting one of the channel path identifiers stored in said selected logical channel group.

14. The method of claim 13, wherein step (3) comprises the step of:

establishing a physical path between the active data unit and the peripheral device using a channel identified by said selected channel path identifier.

15. The method of claim 12, wherein each pointer maintained by said subchannel addresses a logical channel group storing channel path identifiers that identify channels that are connected to the peripheral device assigned to the subchannel.

16. The method of claim 12 in which the system includes switches connected to the peripheral devices and the channels, wherein the channel path identifiers in each of the logical channel groups identify channels which are electrically coupled to the peripheral device via a particular one of the switches.

17. A computer system, comprising:

an active data unit;

a plurality of peripheral devices; and an IO subsystem to transfer information between said peripheral devices and said active data unit, said IO subsystem comprising:

multiple channels electrically coupled to said active data unit;

one or more switches each electrically coupled to one or more of said channels and one or more of said peripheral devices, for routing information between said channels and said peripheral devices;

a plurality of channel path identifiers each identifying one of said channels;

a computer memory having a finite storage capacity;

a plurality of logical channel groups comprising lists that store channel path identifiers, said lists stored in said computer memory, said lists storing varying numbers of channel path identifiers, said lists having a storage capacity that is limited only by said finite storage capacity of said computer memory, channel path identifiers in any one of said logical channel groups identifying channels which are electrically coupled to a particular one of said peripheral devices via a particular one of said switches;

a plurality of subchannels each exclusively assigned to one of said peripheral devices, each of said subchannels maintaining one or more pointers each addressing one of said logical channel groups; and means for establishing a physical communication path between said active data unit and one of said peripheral devices by selecting a channel path identifier in a logical channel group addressed by a pointer maintained by a subchannel assigned to said peripheral device, wherein said physical communication path includes a channel identified by said selected channel path identifier.

18. The system of claim 17, wherein each pointer maintained by each subchannel addresses a logical channel group storing channel path identifiers that identify channels that are connected to a peripheral device assigned to said each subchannel.

* * * * *